United States Patent [19]

Ligon et al.

[11] 3,820,826

[45] June 28, 1974

[54] FITTING STRUCTURE FOR PIPE

[75] Inventors: Elmer R. Ligon; Paul B. Friley, both of Pittsburg, Kans.

[73] Assignee: W. S. Dickey Clay Manufacturing Company, Pittsburgh, Kans.

[22] Filed: Jan. 19, 1972

[21] Appl. No.: 218,895

[52] U.S. Cl.............. 285/55, 285/156, 285/370, 285/423, 138/175
[51] Int. Cl............................................. F16l 9/14
[58] Field of Search ............ 285/55, 155, 156, 230, 285/369, 423, 370; 138/140, 153, 175

[56] References Cited
UNITED STATES PATENTS

| 409,112 | 8/1889 | Morant | 285/156 |
| 2,933,428 | 4/1960 | Mueller | 285/423 |

FOREIGN PATENTS OR APPLICATIONS

| 363,206 | 8/1962 | Switzerland | 285/55 |

*Primary Examiner*—Jordan Franklin
*Assistant Examiner*—Wayne L. Shedd
*Attorney, Agent, or Firm*—Fishburn, Gold & Litman

[57] ABSTRACT

A fitting structure for joining pipe sections, particularly clay pipe, in at least two runs or lines of pipe and including an elongated shell or sleeve portion having aligned sockets in opposite ends thereof with each adapted to receive an end portion of a respective pipe section. The fitting has a branch portion communicating with the sleeve portion and extending laterally therefrom and having a socket therein adapted to receive an end portion of a pipe section. A tubular liner member preferably of clay is positioned within and in engagement with the portions of the sleeve portion and having an aperture therein for communicating the interior thereof with the branch portion. The sleeve portion and branch portion and respective pipe sections have cooperating members engageable to form a fluid tight seal between the fitting structure and the respective pipe sections.

13 Claims, 15 Drawing Figures

PATENTED JUN 28 1974

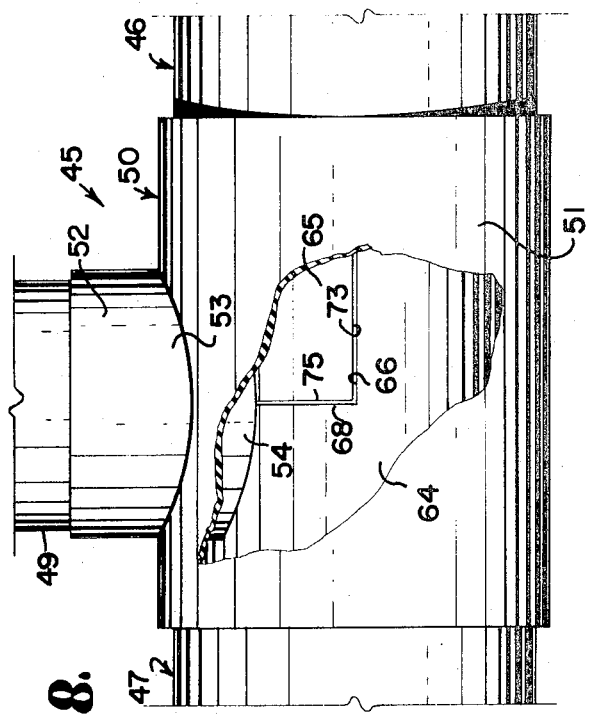
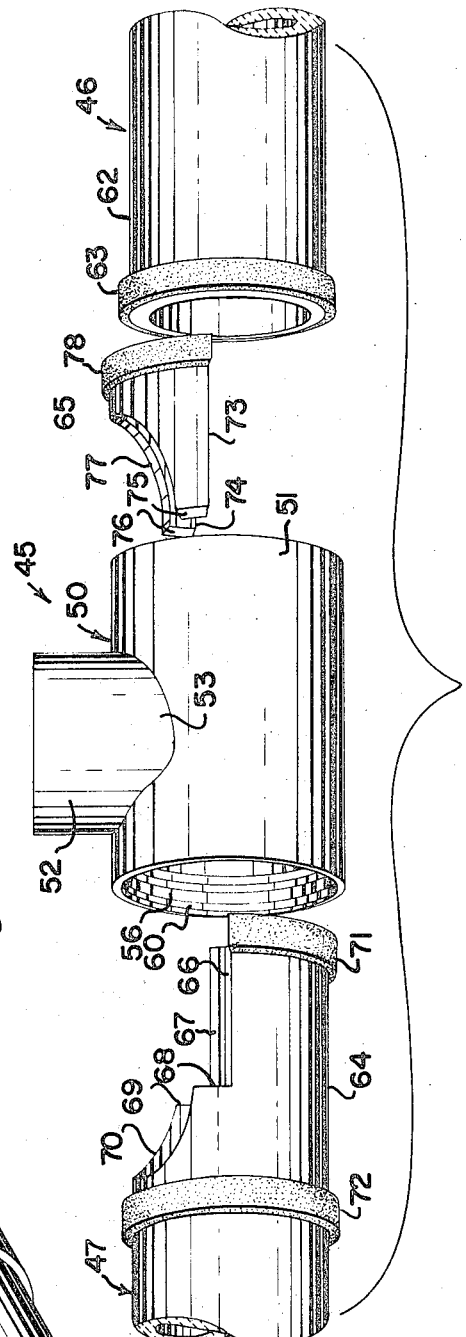
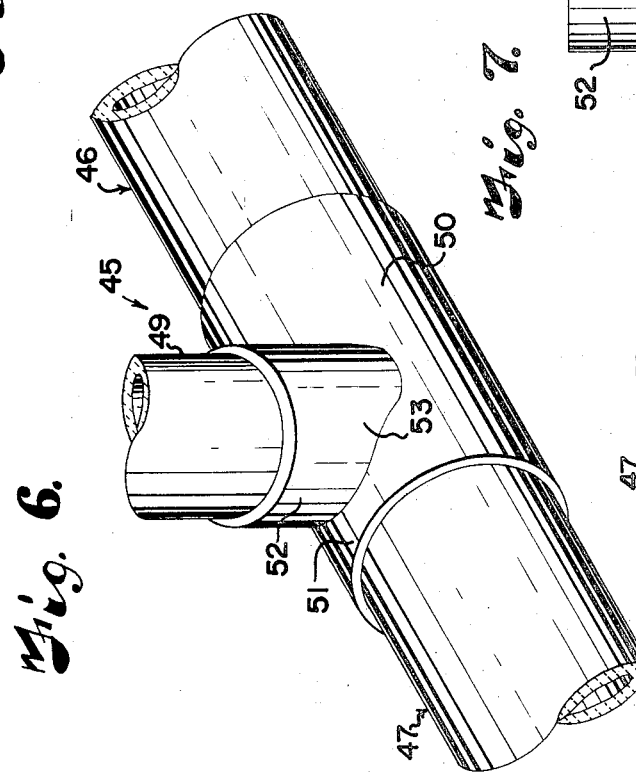

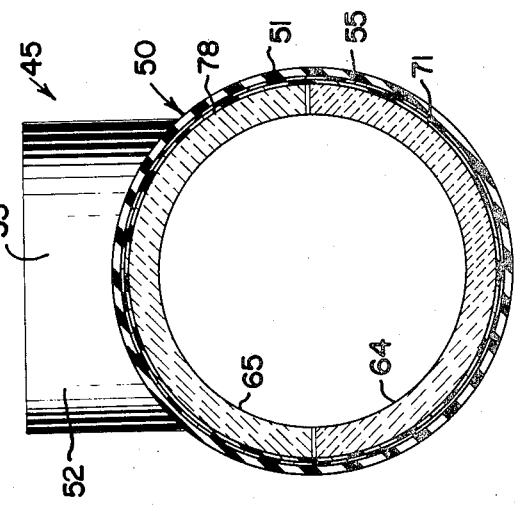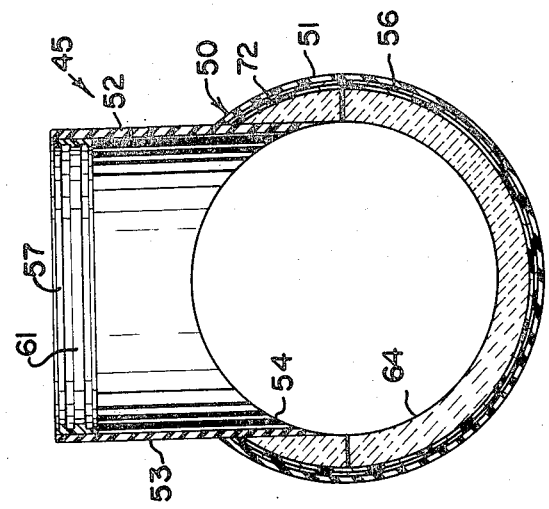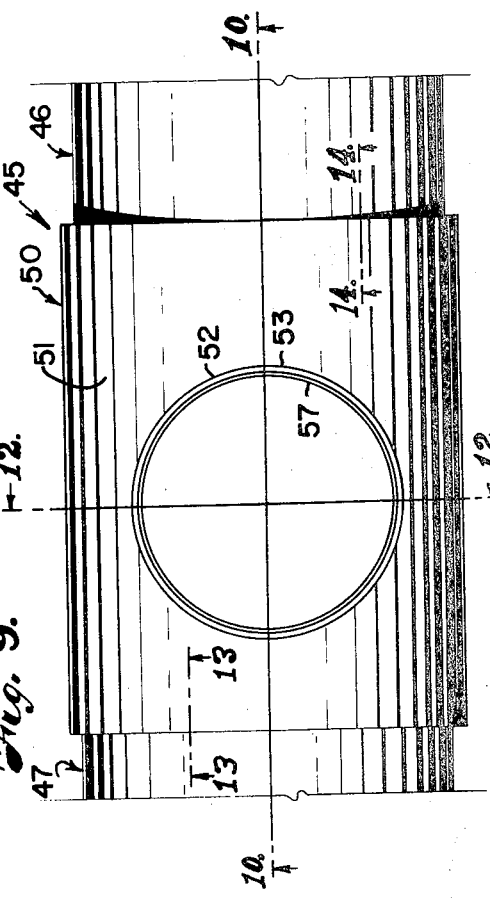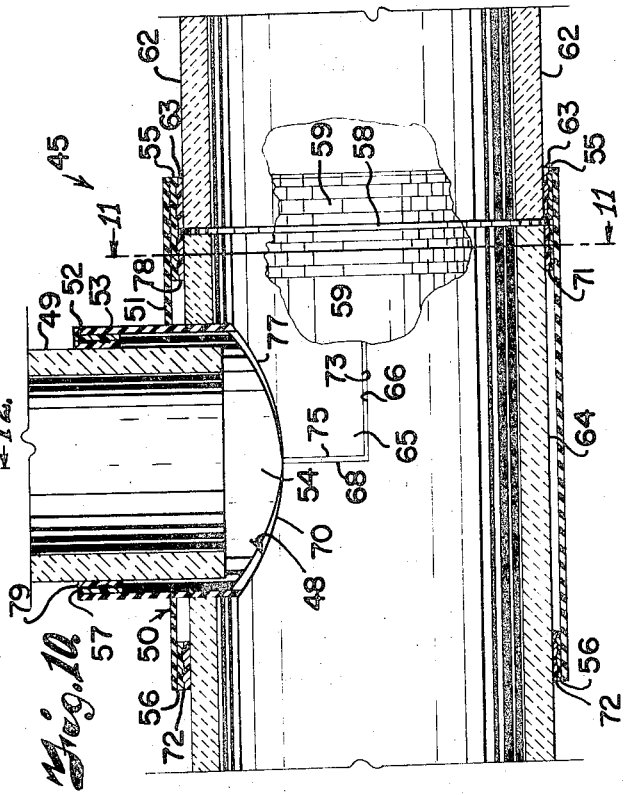

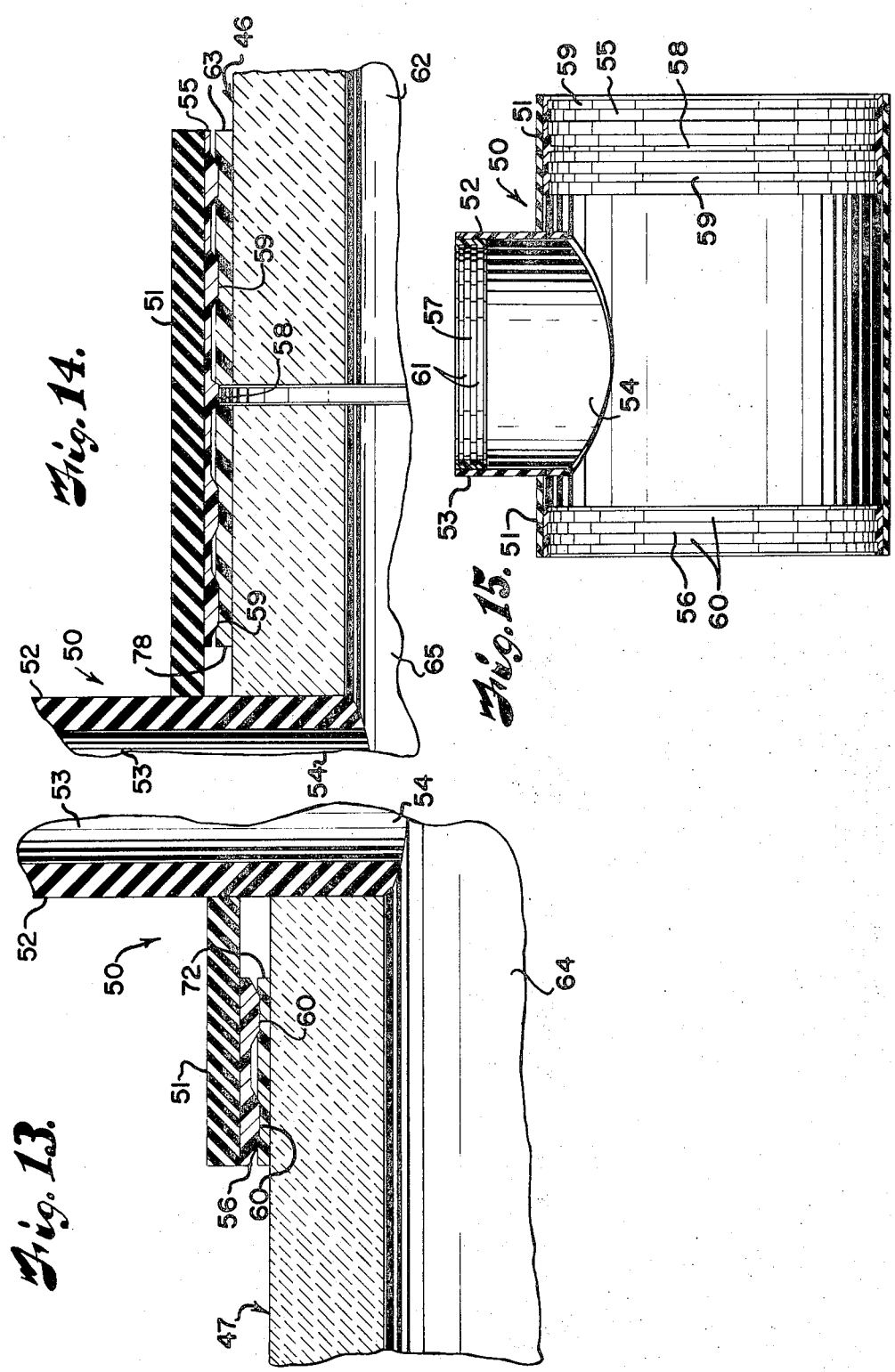

FITTING STRUCTURE FOR PIPE

Pipe sections and fittings joined together to form lines or runs of pipe, such as sewer pipe, for flow of fluids therethrough should be fluid tight and care should be employed in forming joints between adjacent sections of pipe and between fittings and sections of pipe to avoid hoop stresses and the like which may break the pipe or a fluid seal. Hoop stresses develop in bell ends or portions of pipe, particularly ceramic pipe placed in underground installations, during making joints and backfilling of trenches.

Clay pipe fittings have been difficult to make and are expensive. Also in some methods the percent of failures in the firing is high, adding to the cost. While there have been couplings of plastic and the like for joining plain or spigot ends of clay pipe, any attempts to provide fittings such as Tee's, Y's and the like have not been satisfactory.

The present invention relates to pipe joint structures and fitting structures for use with pipe sections having spigot ends and, more particularly, but not limited to spigot end ceramic pipe for underground installations.

The principle objects of the present invention are: to provide a fitting structure for two or more runs or lines of pipe substantially eliminating the aforementioned difficulties and having cooperating portions or members on respective component parts thereof to effect a fluid tight seal between a joint or fitting member and respective lines or runs of pipe; to provide such a joint or filling structure formed of material inert to soil materials for connecting at least two runs or lines of pipe in a fluid tight joint; to provide such a joint or fitting structure having a sleeve or outer wall of substantially rigid synthetic resin having portions to receive pipe ends to be joined and a tubular clay liner between said pipe and in supporting engagement with said outer wall; to provide such a joint or fitting structure having a liner member positioned within and in supporting engagement with a sleeve portion and having an aperture communicating with a branch portion of the fitting structure; to provide such a fitting structure wherein the liner member is formed of facing portions each having edges defining a portion of the aperture therein; to provide such a fitting structure wherein the liner member has circumferentially spaced side edges extending from one end and a connecting edge extending between the side edges to define the aperture; to provide such a pipe joint structure with a resilient collar on respective end portions of sections of pipe inserted in a sleeve portion of a joint or fitting member with annular portions therein having interfering engagement forming a compression seal between the sleeve portion and the collars on the respective pipe end portion; o provide such a joint or fitting structure wherein the sleeve portion of the joint member has one or more circumferential annular portions or beads for positioning in overlying relation to the respective end portion of the sections of pipe to effect a continuous seal and a compression joint between each annular portion or to and the collar; to provide such a fitting structure having a joint member having a sleeve portion and a branch portion sealingly engaging respective pipe end sections for an infiltration free joint when used in sewer constructions; and to provide such a fitting structure which is inexpensive to manufacture and install, durable in use, simple to install, has a preformed joint member having a sleeve member portion and a branch portion each ready to receive spigot ends of pipe, and which is particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment illustrating various objects and features of the fitting structure for pipe of the present invention.

FIG. 6 is a perspective view of a completed joint employing a further modified fitting structure for pipe.

FIG. 7 is an exploded perspective view showing component parts of the further modified fitting structure.

FIG. 8 is a top plan view of a completed joint with portions broken away to show component parts of the further modified fitting structure.

FIG. 9 is a side elevational view of the further modified fitting structure.

FIG. 10 is a longitudinal sectional view through the further modified fitting structure and taken on line 10—10, FIG. 9.

FIG. 11 is a transverse sectional view through the further modified fitting structure taken on line 11—11, FIG. 10.

FIG. 12 is a transverse sectional view through a branch portion of a joint member of the further modified fitting structure and taken on line 12—12, FIG. 9.

FIG. 13 is an enlarged fragmentary longitudinal sectional view taken on line 13—13, FIG. 9 and showing cooperating members for forming a fluid tight seal at one end of a sleeve portion of the joint member.

FIG. 14 is an enlarged fragmentary longitudinal sectional view taken on line 14—14, FIG. 9 and showing cooperating members for forming a fluid tight seal at the other end of the sleeve portion of the joint member.

FIG. 15 is a longitudinal sectional view through the further modified fitting structure.

Figure 5:
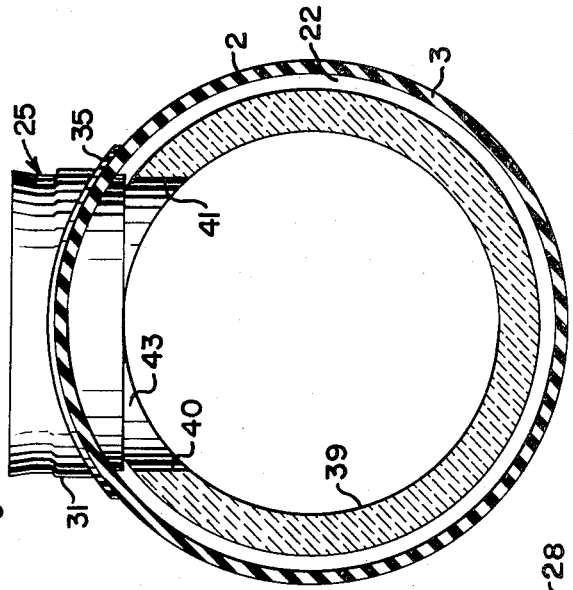
FIG. 5 is a transverse sectional view through the completed joint and taken on line 5—5, FIG. 4.
Figure 3:
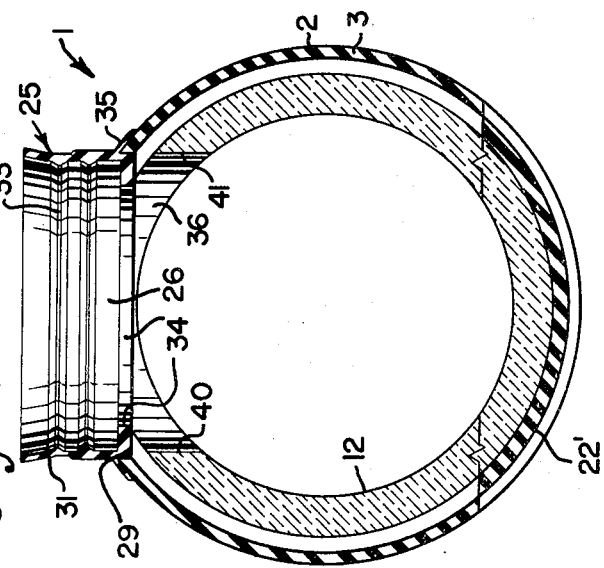
FIG. 3 is a transverse sectional view through the completed joint and taken on line 3—3, FIG. 2.
Figure 1:
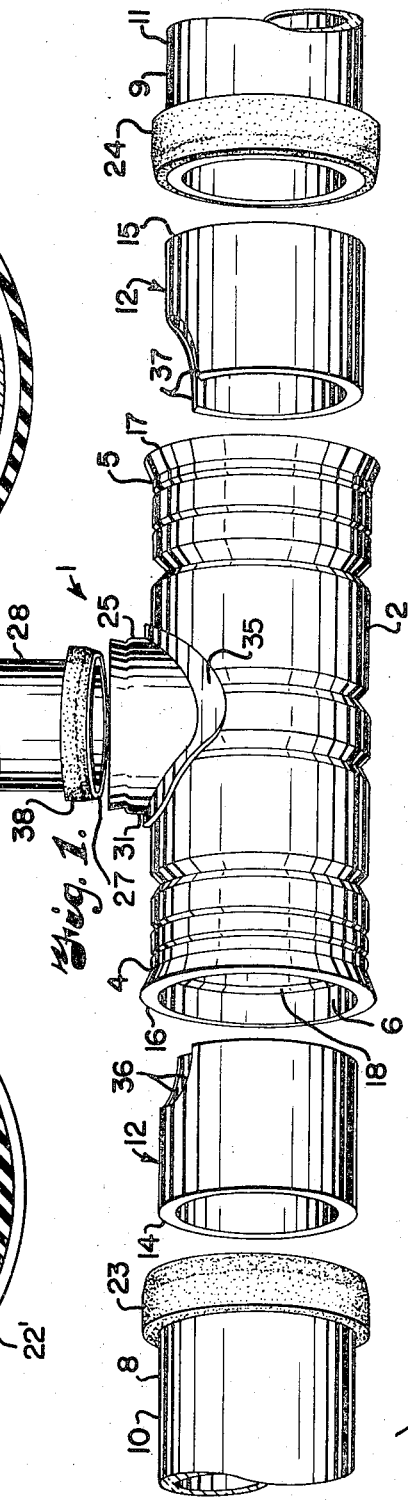
FIG. 1 is an exploded perspective view of a pipe fitting structure embodying features of the present invention.
Figure 2:
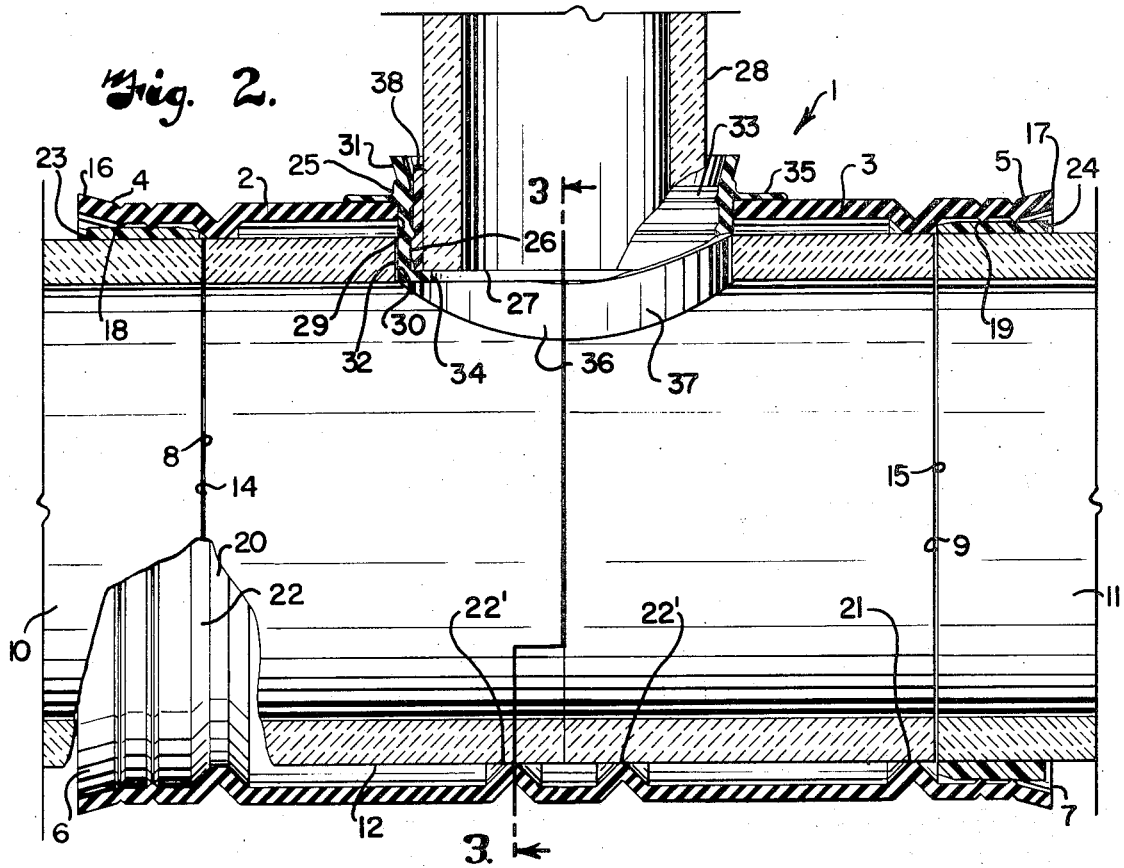
FIG. 2 is a longitudinal sectional view through a completed joint employing the pipe fitting structure.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

The invention comprises a fitting structure forming sealed joints with plain end portions of pipe sections and including a tubular shell having a socket in each end thereof and a tubular liner member within the shell and in supporting engagement with a wall defining the shell. Pipe sections are inserted into the sockets of the shell and each have flow passages aligned with a flow passage through the liner member. The sockets and end portions of the pipe sections are shaped and sized to have portions effecting interference therebetween and compression joint between the portions in engagement.

In the disclosed embodiment of the present invention, the reference numeral 1 generally designates a fitting structure for joining pipe sections, such as vitrified clay pipe. The fitting structure 1 includes an outer shell 2 having a relatively thin wall 3 formed of a substantially inert material, such as a synthetic resin. The shell 2 has opposite end portions 4 and 5 defining sockets 6 and 7 respectively into which are inserted ends 8 and 9 of vitrified clay pipe sections 10 and 11 respectively to be joined. The shell 2 is provided with a tubular liner member 12, preferably in the form of a vitrified clay pipe, which is within and has supporting engagement with portions of the shell 2 thereby providing rigidity and strength to withstand stresses from fill loads, settling, and normal ground movement. The liner member 12 has opposite ends 14 and 15 adjacent the sockets 6 and 7 and extends substantially throughout the length of the shell 2 of the fitting structure 1 so it has full support from the liner and pipe sections.

The shell 2 is illustrates as a sleeve in the form of an elongated generally cylindrical member having the sockets 6 and 7 in the respective opposite end portions 4 and 5 thereof. The sockets 6 and 7 of the shell 2 have outwardly flared ends 16 and 17 respectively defining enlarged portions adapted to receive and guide the ends 8 and 9 of the pipe sections 10 and 11 into said sockets.

The shell has at least one and preferably a plurality of inwardly extending portions or beads 18 and 19 in each socket and extending radially inwardly from the interior surface of the sockets 6 and 7 respectively. The beads or portions 18 and 19 have an inner diameter sized to form an interference with an exterior surface of the ends 8 and 9 of the pipe sections 10 and 11, as later described, to effect a compression joint therebetween.

The shell 2 has portions 20 and 21 forming shoulders 22 positioned adjacent the beads or portions 18 and 19 respectively to define an end for the respective sockets 6 and 7. The portions 20 and 21 extend radially inwardly from an interior surface of the shell 2 a greater distance than the beads or portions 18 and 19 and provide a shoulder or abutment for the ends 8 and 9 of the pipe sections 10 and 11, as later described, to properly position same within the fitting structure 1. The portions 20 and 21 have an inner diameter of a size substantially corresponding to the outer diameter of the liner member 12 and are in engagement with an exterior surface of said liner members adjacent respective opposite ends 14 and 15 thereof whereby the liner member 12 provides support for the shell 2 adjacent the sockets 6 and 7.

The shell 2 has at least one and preferably a plurality of intermediate inwardly extending portions or ribs 22' spaced between the end portions 20 and 21 and extending radially inwardly from the interior surface of the shell 2 and in engagement with the exterior surface of the liner member 12, there being an engagement between shell portions and the liner whereby the length of the shell is supported by the liner member 12 and pipe.

The shoulder forming portions or ribs 20 and 21, the beads or portions 18 and 19, and the intermediate ribs 22' may be formed in any desired manner, however, in the illustrated structure, they are formed by deforming inwardly respective portions of the thin outer wall 3 of the shell 2. The shell 2 is preferably formed of a portion of a tubular member having a substantially uniform diameter whereby the shell 2 also has a uniform diameter except at the deformed portions thereof.

It is preferred that the shell 2 be formed of a substantially rigid material having sufficient flexibility to permit nominal angular movement of the pipe sections 10 and 11 transverse to the axis of the liner member 12 and bending of the wall 3 of the shell 2. A desired modulus of elasticity is in the range of 50,000 to 2,000,000 pounds per square inch and a desired tensile strength in the range of 3,000 to 8,000 pounds per square inch, therefore, the shell 2 is formed of a suitable thermoplastic synthetic resinous material, such as polypropylene, polystyrene, polyvinyl chloride or acrylonitrile-butadiene-styrene (commonly referred to as ABS). Polyvinyl chloride has been found to provide the desired rigidity combined with sufficient tensile strength and flexibility to support the respective sections of pipe and to permit relative movement between the pipe sections and respective portions of the shell 2 and the liner member 12, all without exceeding the strength of the wall 3 of the shell 2.

Effecting a fluid tight seal between the shell 2 and the pipe sections 10 and 11 while permitting relative angular movement therebetween is effected by resilient collars 23 and 24 mounted on an exterior surface of the end portions of the pipe sections 10 and 11 respectively. The resilient collars 23 and 24 on the pipe sections 10 and 11 are positioned and adapted to engage the portions or beads 18 and 19 in the sockets 6 and 7 respectively to form a flexible seal which will remain fluid tight even when the respective pipe sections deflect or move during back filling, settling, and during normal ground movement to thereby resist leakage from both within and outside the respective pipe sections and the shell 2.

The resilient collars 23 and 24 are bonded to exterior surface of the pipe sections 10 and 11 respectively and are formed of a suitable compressible material having a very slight change in hardness over a wide temperature range and having dimensional stability over a wide temperature range thereby avoiding brittleness and cracking.

It is preferred that the material of the resilient collars 23 and 24 have a low compression set without cold flow under pressure; good adhesion to the respective pipe sections under repeated temperature cycles; excellent resistance to acid, alkalis, solvents, sewer gas, microorganisms and root penetration; and and resistance to leakage from both within and outside the shell 2. It is, therefore, preferred that the resilient collars 23 and 24 be formed of a suitable plastic, such as a polyurethane elastomer bonded on the respective pipe sections. The resilient collars 23 and 24 preferably have a Shore A durometer value of 35 to 80 and particularly good adhesion to the respective pipe sections in spite of repeated temperature cycles varying over a wide range.

The illustrated fitting structure 1 includes a generally cylindrical branch portion 25 communicating with the shell 2 and extending laterally therefrom and having a socket 26 therein adapted to receive an end 27 of a pipe section 28 therein. The shell 2 has an aperture 29 formed in the wall 3 thereof to receive the branch portion 25, as later described, and the liner member 12 has an aperture 30 formed therein for communication with the branch portion 25, as later described.

In the illustrated structure, the branch portion 25 has an outer end portion 31 extending outwardly from the shell 2 and an inner end portion 32 received within the aperture 30 in the liner member 12 and extending inwardly from the wall 3 of the shell 2. The branch portion 25 has at least one and preferably a plurality of inwardly extending portions or beads 33 on an interior surface thereof and extending radially inwardly from the interior surface of the branch portion 25 and sized to form an interference with an exterior surface of the pipe section 28, as later described, to effect a compression joint therebetween.

The inner end portion 32 of a branch portion 25 has a flange 34 extending generally radially inwardly and positioned to be engaged by the end 27 of the pipe section 28 received within the branch portion 25 to thereby define an end of the socket 26 and to properly position the pipe section 28 within the fitting structure 1. An outer flange 35 extends outwardly from an exterior surface of the branch portion 25 and is in engagement with an exterior surface of the shell 2 adjacent the aperture 29 therein. The outer flange 35 is suitably secured to the exterior surface of the shell 2, as by being cemented thereto, whereby the shell 2 and the branch portion 25 are joined together to form the fitting structure 1.

The liner member 12 within the fitting structure 1 is illustrated as a two piece member having portions positioned in substantially end-to-end abutment within the shell 2 and having facing edges 36 and 37 extending from adjacent ends of the two pieces or portions of the liner member 12 and each of the edges 36 and 37 defining a portion of the aperture 30 in the liner member 12. The edges 36 and 37 defining the respective portions of the aperture 30 in the linear member 12 each extend from adjacent ends of the two pieces or portions respectively whereby the two pieces or portions of the liner member 12 may be moved into the shell 2 from the opposite end portions 4 and 5 thereof until the edges 36 and 37 defining the respective portions of the aperture 30 are in engagement with the inner end portion 32 of the branch portion 25 thereby properly positioning the two pieces or portions of the liner member 12 with the shell 2. The facing or adjacent ends of the pieces or portions may, if desired, be spaced apart to permit bending of the shell 2 during trench back filling, settlement, and normal ground movement of soil having the fitting structure 1 therein.

Forming a completed joint employing the fitting structure 1 is extremely fast and simple and requires only cleaning of the exposed interior surfaces of the sockets 6 and 7 and the exposed surfaces of the resilient collars 23 and 24 on the pipe sections 10 and 11, application of a suitable lubricant material on interior surfaces of the sockets 6 and 7, insertion of the spigot end portions of the pipe sections 10 and 11 into the sockets 6 and 7 respectively so as to effect interfering engagement between the resilient collars 23 and 24 and the beads or portions 18 and 19 in the sockets 6 and 7 and seating engagement between the ends of the pipe sections 10 and 11 and the end portions or ribs 20 and 21 respectively. The facing portions or pieces of the liner member 20 are moved into the shell 2 from opposite ends thereof and then the pipe sections 10 and 11 are positioned in the sockets 6 and 7 respectively. The exposed surfaces on the interior surface of the branch portion 25 are then cleaned and a resilient collar 38 on an end 27 of the pipe section 28 is also cleaned and a suitable lubricant material is applied on the interior surfaces of the socket 26 and on the spigot end portion of the pipe section 28 which is inserted into the socket 26 within the branch portion 25 to effect interfering engagement between the resilient collar 38 and the beads or portions 33 in the socket 26 and seating engagement between the end of the pipe section 28 or the resilient collar 38 thereon and the flange 34 within the branch portion 25.

Figure 4:
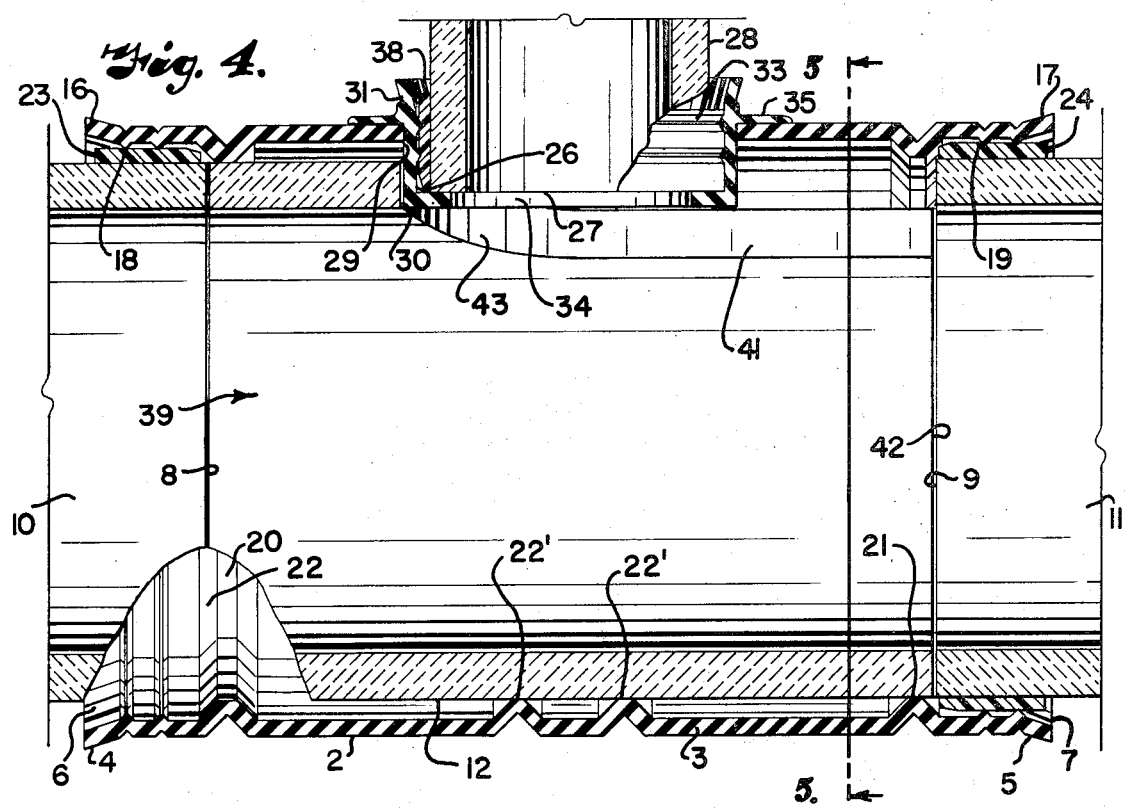
FIG. 4 is a longitudinal sectional view through a completed joint employing a modified pipe fitting structure.

FIGS. 4 and 5 illustrate a modified liner member 39 for use within the shell 2 and which has an aperture or slot therein for communication with the branch portion 25. The aperture or slot in the modified member 39 is defined by circumferentially spaced longitudinally extending side edges 40 and 41 which extend from one end 42 of the modified liner member 39 and a connected edge 43 extending between the side edges 40 and 41. The connecting edge 43 extends in a curvilinear path between the side edges 40 and 41 and is engageable with the inner end portion 32 of the branch portion 25.

Forming a completed joint using the modified liner member 39 within the shell 2 is substantially similar to forming a completed joint with the components of the fitting structure 1 except that the modified liner member 39 is moved into the shell 2 from one end thereof until the connecting edge 43 is in engagement with an exterior surface of the inner end portion 32 of the branch portion 25.

FIGS. 6 to 15 inclusive illustrate a further modified fitting structure 45 for joining pipe sections in at least two runs or lines of pipe. The fitting structure 45 is adapted to have an outer wall of synthetic resin supportingly engaged with a clay pipe liner which is illustrated as being one of the pipe sections. The fitting structure includes a pair of pipe sections 46 and 47 positioned in end-to-end relation and defining one line or run of pipe with one of the pipe sections, for example pipe section 47, having portions defining an aperture 48 therein for flow of fluid between the one line of pipe and a second or intersecting line or run of pipe, as defined by a pipe section 49. The fitting structure 45 includes a joint or fitting member 50 having a sleeve or shell portion 51 sized to receive adjacent end portions of the pipe sections 46 and 47 and a branch portion 52 communicating with the aperture 48 and extending outwardly from the sleeve portion 51 to receive an end portion of the pipe section 49 in the second line of pipe.

As in the fitting structure 1 and the modified fitting structure 35, the joint or fitting member 50 may have the branch portion 52 thereof positioned at any desired angle relative to the longitudinal axis of the sleeve portion 51, such as 30°, 45°, 60° or the like, to form a Y- fitting or the branch portion 52 may be positioned substantially normal or perpendicular 90° to the longitudinal axis of the sleeve portion 51 to form a T-fitting. The joint or fitting member 50 is illustrated as a T-fitting having the sleeve portion 51 thereof in the form of an elongated generally cylindrical member having aligned sockets therein and sized to receive end portions of the pipe sections 46 and 47 therein for forming a fluid tight seal therewith, as later described.

The branch portion 52 has an outer end portion 53 extending outwardly from the sleeve portion 51 of the joint or fitting member 50 and adaptable to receive an end portion of the pipe section 49 therein. The branch portion 52 has an inner end portion 54 extending inwardly from the sleeve portion 51 and received within the aperture 48, as later described.

The sleeve portion 51 may have shoulder forming portions or ribs and beads or portions in socket portions thereof and intermediate ribs spaced between the sockets for engagement with a supporting liner, as shown in FIGS. 1 to 5 inclusive, however, it is desirable to mount resilient gaskets 55 and 56 in the sockets of the sleeve portion which have beads or portions extending inwardly to engage the pipe sections or resilient collars thereon, as later described.

A fluid tight seal between portions of the joint or fitting member 50 and the pipe sections 46, 47, and 49 while permitting relative movement therebetween is effected by resilient gaskets 55 and 56 mounted on an interior surface of respective opposite ends of the sleeve portion 51 of the joint or fitting member 50 and extending inwardly from an interior surface of the branch portion 52 and extending inwardly from the interior surface thereof. The resilient gasket 57 may be positioned at any desired location in the branch portion 52, however, in the illustrated structure, the resilient gasket 57 is positioned on the interior surface of the outer end portion 53 thereof.

One of the resilient gaskets on the sleeve portion 51, for example resilient gasket 55, is engageable with the pipe sections 46 and 47. The one resilient gasket 55 has a rib 58 positioned intermediate the ends thereof and extending radially inwardly from an interior surface thereof. The rib 58 is sized and positioned to have respective opposite sides thereof engaged by facing ends of the end portions of the pipe sections 46 and 47, as later described, to effect a compression joint therebetween.

The one resilient gasket 55 effects a fluid tight seal with the pipe sections 46 and 47 and has at least one and perferably a plurality of inwardly extending portions or beads 59 on an interior surface thereof and positioned on opposite sides of the rib 58. The inwardly extending beads or portions 59 are sized to form an interference with an exterior surface of the pipe sections 46 and 47, as later described, to effect a compression joint therebetween.

The other resilient gasket 56 on the interior surface of the other end of the sleeve portion 51 is positioned to effect a fluid tight seal with the pipe section 47 and the other resilient gasket 56 has at least one and preferably a plurality of inwardly extending portions or beads 60 on an interior surface thereof and extending radially inwardly from the interior of the resilient gasket 56 and the inwardly extending beads or portions 60 are sized to form an interference with an exterior surface of the pipe section 47, as later described, to effect a compression joint therebetween.

The resilient gasket 57 on an interior surface of the branch portion 52 also has at least one and preferably a plurality of inwardly extending portions or beads 61 to engage an exterior surface of the pipe section 49 to effect a fluid tight seal between the branch portion 52 and the pipe section 49, as later described.

It is also preferred that the joint or fitting member 50 be formed of a substantially rigid material having sufficient flexibility to permit nominal angular movement of the pipe sections 46 and 47 and the pipe section 49 transverse to the respective axis of the sleeve portion 51 and the branch portion 52 respectively and bending of the sleeve portion 51 and the branch portion 52 of the joint or fitting member 50. A desired modulus of elasticity is in the range of 50,000 to 2,000,000 pounds per square inch and a desired tensile strength is in the range of 3,000 to 8,000 pounds per square inch. Therefore, the joint or fitting member 50 is formed of a suitable thermoplastic synthetic resinous material such as polypropylene, polystyrene, polyvinyl chloride or acrilonitrilebutadiene-styrene (commonly referred to as ABS). Polyvinyl chloride has been found to provide the desired rigidity combined with sufficient tensile strength and flexibility to support the respective sections of pipe and permit relative movement between the pipe sections and respective portions of the joint or fitting member 50, all without exceeding the strength of the joint or fitting member 50.

The gaskets 55, 56, and 57 are bonded to interior surfaces or respective portions of the joint or fitting member 50 and are formed of a suitable resilient compressible material having a very slight change in hardness over a wide temperature range and having dimensional stability over a wide temperature range, thereby avoiding brittleness and cracking.

It is preferred that the material of the resilient gaskets 55, 56, and 57 have a low compression set without cold flow under pressure; good adhesion to the respective portions of the joint or fitting member 50 under repeated temperature cycles; excellent resistance to acid, alkalis, solvents, sewer gas, microorganisms and root penetration; and resistance to leakage from both within and outside the fitting structure 45. It is, therefore, preferred that the resilient gaskets of the joint or fitting member 50 be formed of a suitable plastic, such as a polyurethane elastomer, molded on respective interior surfaces of the end portions of the sleeve portion 51 and the branch portion 52. The resilient gaskets 55, 56, and 57 preferably have a Shore A durometer value of 35 to 80 and particularly good adhesion to the joint or fitting member 50 in spite of repeated temperature cycles varying over a wide range.

The resilient gaskets 55, 56, and 57 are adapted to engage exterior surfaces of the pipe sections 46, 47, and 49 respectively to form a flexible seal which will remain fluid tight even when the respective pipe lines deflect during backfilling or settling and during normal ground movements to thereby resist leakage from both within and outside of the respective lines of pipe. It is preferred that the pipe sections 46, 47, and 49 have resilient collars thereon, as later described, engageable with the resilient gaskets 55, 56, and 57 to thereby permit additional line deflection and to effect sealing engagement between the respective gaskets and collars.

The pipe section 46 is illustrated as having a spigot end portion 62 having a resilient collar 63 on the spigot end portion 62 and sized to be received within the resilient gasket 55 and to have an end thereof engageable with one side of the rib 58 and an exterior surface thereof sized to be engageable by the beads or portions 59 between the rib 58 and one of the resilient gasket 55.

The aperture 48 in the pipe section 47 receives the inner end portion 54 therein, therefore, the portions of the pipe section 47 include a spigot end portion 64 and a pipe portion 65 received in the spigot end portion 64 and cooperating therewith to surround the inner end portion 54 and to define the aperture 48.

In the illustrated structure, the spigot end portion 64 of the pipe section 47 has a longitudinally extending slot therein to receive the pipe portion 65 and the longitudinally extending slot is defined by a pair of substantially parallel opposed first or side edges 66 and 67 extending from an end of the spigot end portion 64 and substantially along the longitudinal axis of opposed portions of a wall of the pipe section 47. A pair of second or end edges 66 and 67 extend circumferentially from the first or side edges 66 and 67 respectively to define abutments or shoulders to be engaged by an end of the pipe portion 65, as later described. A connecting edge 70 extends between the second or end edges 68 and 69 and along a curvilinear path to define one portion of the aperture 48.

A resilient collar portion 71 is formed on the spigot end 64 of the pipe section 47 and extends between the first or side edges 66 and 67 adjacent the end thereof. The resilient collar portion 71 is received within the resilient gasket 55 and an end of the resilient collar portion 71 is engageable with a side of the rib 58 opposite the resilient collar 63 on the spigot end portion 62 and the beads or portions 59 between the rib 58 and the other end of the resilient gasket 55 are engageable with an exterior surface of the resilient collar portion 71.

A second resilient collar 72 is formed on the spigot end portion 64 and positioned to have the connecting edge 70 between the second resilient collar 72 and the resilient collar portion 71. The second resilient collar 72 is sized to be received within the resilient gasket 57 in the other end of the sleeve portion 51 and to have the beads 60 on the resilient gasket 57 effect interfering engagement with an exterior surface of the second resilient collar 72.

The pipe portion 65 is mounted in the spigot end portion 64 of the pipe section 47 and has one end thereof in substantially end-to-end relation with the end of the pipe section 46 and the other end of the pipe portion 65 in engagement with the abutments or shoulders defined by the second or end edges 68 and 69. The pipe portion 65 is illustrated as having a pair of substantially parallel opposed side edges 73 and 74 extending longitudinally between the ends of the pipe portion 65 and engageable with the first or side edges 66 and 67 respectively of the spigot end portion 64 of the pipe section 47. The other end of the pipe portion 65 has end edges 75 and 76 extending circumferentially from the side edges 73 and 74 respectively and engageable with the abutments or shoulders defined by the second or end edges 68 and 69 respectively of the spigot end portion 64. A connecting edge 77 extends between the end edges 75 and 76 and extends along a curvilinear path in opposed relation with the connecting edge 70 of the spigot end portion 64 of the pipe section 47 to thereby define a remaining portion of the aperture 48.

The pipe portion 65 has a resilient collar portion 78 on the one end portion thereof and extending between the side edges 73 and 74 and the resilient collar portion 78 is alignable with the resilient collar portion 71 on the spigot end portion 64 of the pipe section 47 to cooperate therewith to define a substantially continuous resilient collar around the spigot end portion 64 and the pipe portion 65. The resilient collar portion 78 also has an end thereof engageable with the rib 58 of the resilient gasket 55 and an exterior surface sized to be engageable with the beads or portions 59 between the rib 58 and the other end of the resilient gasket 55 to effect interfering engagement therebetween and a compression joint.

The resilient collar 63, resilient collar portions 70 and 78, and the second resilient collar 72 are bonded to the respective pipe sections and pipe portion and are formed of a suitable resilient compressible material having a very slight change in hardness over a wide temperature range and having dimensional stability over a wide temperature range thereby avoiding brittleness cracking.

It is preferred that the material of the respective collars also have a low compression set without cold flow under pressure; good adhesion to the respective pipe sections and pipe portion under repeated temperature cycles; excellent resistance to acids, alkalis, solvents, sewer gases, micro-organisms and root penetration; and resistance to leakage from both within and outside the fitting structure 45. It is, therefore, preferred that the collars and collar portions of the fitting structure 45 be formed of a suitable plastic, such as a polyurethane elastomer, molded on the pipe sections 46 and 47 and on the pipe portion 65. The resilient collars and collar portions preferably have a Shore A durometer value of 35 to 80 and particularly good adhesion to the respective pipe sections and portion in spite of repeated temperature cycles varying over a wide range.

The resilient collars and collar portion are molded and bonded on the pipe sections and pipe portion so that the exterior surfaces of the collars and collar portions can be formed to substantially precise dimensions with relatively small tolerances and true roundness even though the respective pipe sections and portion may be out of round to thereby effect proper installation within the joint or fitting member 50.

Forming the fitting structure 45 is extremely fast and simple and requires only cleaning of the exposed surfaces on the respective resilient collars and collar portions and interior surfaces of the resilient gaskets within the joint or fitting member 50, application of a suitable lubricant material on interior surfaces of the resilient gaskets, insertion of the spigot end portion 64 of the pipe section 47 into the sleeve portion 51 so as to effect interfering engagement between the resilient gasket 56 and the second resilient collar 72 and interfering engagement between a portion of the resilient gasket 55 and the resilient collar portion 71 and seating engagement between the end of the resilient collar portion 71 and the rib 58 of the resilient gasket 55, positioning the pipe portion 65 in the sleeve portion 51 in a position having the connecting edge 77 thereof cooperating with the connecting edge 70 of the pipe section 47 to define the aperture 48 and to surround the inner end portion 54 of the branch portion 52 and effecting interfering engagement between a portion of the resilient gasket 55 and seating engagement of the resilient collar portion 78 with the rib 58 of the resilient gasket 55 to thereby form a T-fitting member prepared to receive the pipe sections 46 and 49. The pipe section 46 is then inserted in the sleeve portion 51 with an end of the resilient collar 63 on the spigot end portion 62 in seating engagement with the rib 58 on the resilient gasket 55 and interfering engagement between a portion of the resilient gasket 55 and the resilient collar 63 on the spigot end portion 62 of the pipe section 46 thereby forming a fluid tight seal. The fitting or joint member 50 is thereby prepared to receive the pipe section 49 in the branch portion 52 with the resilient gasket 57 forming interfering engagement with the pipe section 59 or a resilient collar 79 on an end portion thereof.

It is to be understood that while We have illustrated and described certain forms of our invention, it is not to be limited to these specific forms or arrangements of parts herein described and shown.

What we claim and desire to secure by Letters Patent is:

1. A fitting structure forming sealed joints with plain end portions of pipe sections and comprising:
   a. an elongated generally cylindrical shell having opposite end portions and an outer wall of substantially inert synthetic resin material;
   b. a socket in each opposite end portion of said shell and adapted to receive an end portion of respective pipe sections in sealing engagement therein;
   c. a tubular liner member of vitrified clay within and in supporting engagement with the outer wall of said shell and extending between the sockets in opposite end portions thereof and defining a flow passage therebetween;
   d. a plain end pipe section of vitrified clay for each socket in said shell;
   e. a resilient collar on an end portion of each of said plain end pipe sections; and
   f. at least one inwardly extending annular portion in each socket of said shell and sized to form an interference with an exterior surface of said respective resilient collar to effect a compression joint therebetween.

2. A fitting structure as set forth in claim 1 including:
   a. a generally cylindrical branch portion communicating with said shell and having an outer wall of substantially inert synthetic resin material;
   b. a socket in said branch portion and adapted to receive an end portion of a pipe section therein; and
   c. said tubular liner member having an aperture therein substantially aligned with the branch portion for communication of said branch portion with the flow passage in the liner.

3. A fitting structure as set forth in claim 2 wherein:
   a. said liner member has ends thereof positioned to be aligned with the pipe sections received within said respective sockets of said shell.

4. A fitting structure as set forth in claim 2 wherein:
   a. said branch portion has an outer end portion extending outwardly from said shell and an inner end portion extending inwardly from said shell;
   b. the inner end portion of said branch portion is positioned within the aperture in said liner member; and
   c. the inner end portion of said branch portion has an abutment member extending generally radially inwardly and positioned to be engaged by an end of said pipe section received within said branch portion.

5. A pipe fitting structure as set forth in claim 2 wherein:
   a. said liner member is formed of a two piece member having facing portions each having edges defining a portion of the aperture therein; and
   b. the edges defining the respective portions of the aperture each extend from adjacent ends of the facing portions of said two piece liner member whereby the facing portions of the liner member may be moved into said shell from opposite ends thereof until the edges defining the respective portions of the aperture are in engagement with the inner end portion of said branch portion.

6. A fitting structure as set forth in claim 5 wherein:
   a. said resilient collars on said end portions of said pipe sections are formed of a polyurethane elastomer bonded to an exterior surface of the respective pipe sections;
   b. said joint member is formed of a thermoplastic synthetic resinous material.

7. A fitting structure as set forth in claim 5 wherein:
   a. said resilient collars are formed of a polyurethane elastomer bonded to the respective surfaces and having a Shore A durometer value of 35 to 80;
   b. said joint member is a substantially rigid member having a modulus of elasticity in the range of 50,000 to 2,000,000 pounds per square inch; and
   c. said joint member is formed of a material having a tensile strength in the range of 3,000 to 8,000 pounds per square inch.

8. A fitting structure for spigot end pipe sections and comprising:
   a. a first portion of pipe and a second portion of pipe having respective end portions thereof in substantially end-to-end relation and each having a wall defining a flow passage therethrough;
   b. means in one of said portions of pipe defining an aperture in the wall thereof;
   c. a joint member having a sleeve portion sized to receive said first and second portions of pipe and a branch portion communicating with the aperture in said wall of one of said portions of pipe and extending outwardly therefrom; and
   d. cooperating means on said sleeve portion of said joint member and on said first and second portions of pipe to form a fluid tight seal between said sleeve portion of said joint member and said first and second portions of pipe.

9. A fitting structure as set forth in claim 8 wherein said means defining an aperture in the wall of one of said portions of pipe includes:
   a. edges of the wall of an end part of one of said first and said second portions of pipe defining a longitudinally extending slot in facing relation with an end part of the other of said first and said second portions of pipe; and b. a pipe part positioned in the longitudinally extending slot in the one of said first and said second portions of pipe and having edges adjacent said edges of the end part of the one of said first and said second portions of pipe and positioned to cooperate with the slot defining edges thereof to define respective portions of said aperture.

10. A fitting structure as set forth in claim 9 wherein said means to form a fluid tight seal comprises:
   a. annular ribs for an interior surface of each end of said sleeve portion and extending inwardly therefrom;
   b. a resilient collar on said end parts of said first and said second portions of pipe and each engageable with one of said annular ribs;
   c. a resilient collar on said pipe part and alignable with said resilient collar on the one of said first and said second portions of pipe and engageable with one of said annular ribs; and
   d. a second resilient collar on the one of said first and said second portions of pipe and positioned to have said aperture between said second resilient collar and said first named resilient collar on the one of said first and said second portions of pipe, said second resilient collar being engageable with the other of said annular rib.

11. A fitting structure as set forth in claim 8 wherein:
   a. said branch portion of said joint member has an inner portion extending inwardly from said sleeve portion to be received within said aperture and an outer portion extending outwardly from said sleeve portion;
   b. said means defining said aperture includes edges of the wall of an end part of one of said first and said second portions of pipe defining a slot extending longitudinally from the end thereof and a pipe part positioned in said longitudinally extending slot and having edges adjacent said slot defining edges and positioned to cooperate with said slot defining edges to define respective portions of said aperture;
   c. said means to form a fluid tight seal includes an annular rib extending inwardly from an interior surface and at each end of said sleeve portion of said joint member and a resilient collar on each of said end parts of said first and said second portions of pipe and on said pipe part and a second resilient collar on said one of said first and said second portions of pipe and positioned to have said aperture between said second resilient collar and said first named resilient collar on said one of said first and said second portions of pipe; and
   d. said resilient collars on said end parts of said first and said second portions of pipe and on said pipe part are engageable with respective portions of one of said annular ribs and said second resilient collar is engageable with the other of said annular ribs.

12. A fitting structure as set forth in claim 9 wherein:
   a. said edges of the wall defining the longitudinally extending slot in the one of said first and said second portions of pipe include a pair of substantially parallel opposed first edges extending from the end of said section of pipe and substantially along the longitudinal axis of opposed portions of the wall of said one portion of pipe and a pair of second edges extending circumferentially from respective first edges and defining respective abutments and a connecting edge extending between said second edges and along a curvilinear path to define one portion of said aperture; and
   b. said edges of said pipe part include a pair of substantially parallel opposed side edges extending longitudinally from the end of said pipe part and engageable with respective first edges of said one portion of pipe and a pair of end edges extending circumferentially from respective side edges and engageable with respective abutments and a connecting edge extending between said end edges and along a curvilinear path in opposed relation with the connecting edge of said one portion of pipe to define a remaining portion of said aperture.

13. A fitting structure for plain end pipe sections and comprising:
   a. a first portion of pipe having a resilient collar on an exterior surface of one end portion thereof;
   b. a second portion of pipe having a wall with edges thereof defining a longitudinally extending slot extending from one end thereof, said one end of said second portion of pipe being in facing relation with said one end of said first portion of pipe and having a resilient collar thereon;
   c. a pipe part mounted in the longitudinally extending slot in the one end of said second portion of pipe and having a resilient collar on one end thereof and aligned with said resilient collar on said second portion of pipe, said pipe part having the other end thereof having edges positioned to cooperate with the edges defining said slot to define respective portions of an aperture;
   d. a second resilient collar on said second portion of pipe and spaced from said slot therein;
   e. a joint member having a sleeve portion sized to receive said first portion of pipe and said second portion of pipe and said pipe part and the collars thereon, said joint member having a branch portion communicating with the aperture and extending outwardly from said sleeve portion of said joint member; and
   f. means on said sleeve portion of said joint member and engageable with respective resilient collars on said first and said second portions of pipe and on said pipe part and engageable with said second resilient collar to effect a fluid tight seal between said sleeve portion and respective collars on said first and said second portions of pipe and on said pipe part.

* * * * *